United States Patent [19]

Di Giampaolo

[11] Patent Number: 5,493,780
[45] Date of Patent: Feb. 27, 1996

[54] TOOL FOR CARPENTRY CALIPERS FOR CURVED FRAMES WITH JOINED END CORNERS

[75] Inventor: Teresa Di Giampaolo, Falconara, Italy

[73] Assignee: D.G.T. - S.R.L., Italy

[21] Appl. No.: 311,158

[22] Filed: Sep. 23, 1994

[30] Foreign Application Priority Data

Sep. 29, 1993 [IT] Italy ................... AN93A0054

[51] Int. Cl.$^6$ .................................................. B43L 11/04
[52] U.S. Cl. ....................... 33/27.01; 33/27.03; 33/30.1
[58] Field of Search ................... 33/27.01, 27.03, 33/27.031, 27.032, 27.04, 27.06, 27.07, 30.1, 30.2, 30.6, 26

[56] References Cited

U.S. PATENT DOCUMENTS

| | | | |
|---|---|---|---|
| 1,948,952 | 2/1934 | Wallerius | 33/27.01 |
| 3,002,280 | 10/1961 | Bennett, Jr. | 33/27.03 |
| 5,038,841 | 8/1991 | Larmon | 33/27.03 |
| 5,189,800 | 3/1993 | Morita et al. | 33/30.1 |

*Primary Examiner*—Christopher W. Fulton
*Attorney, Agent, or Firm*—Leonard Bloom

[57] ABSTRACT

A device for making a frame having at least two adjacent portions of distinct curvatures with a rounded joint between these two portions comprises a conventional carpentry caliper for outlining at least one of two portions on the frame, an accessory unit (for outlining the rounded joint) movably secured to the carpentry caliper and a cutting device secured to the accessory unit for cutting out the two portions and the joint therebetween. The accessory unit comprises a rod holding unit secured to the front end of the first rods on the carpentry caliper and extended a desired distance from the support of the carpentry caliper. A pair of parallel second rods is slidably secured to the rod holding unit, and a sliding block is slidably secured to the pair of the second rods. The second rods are revolvable in respect to the first rods. The sliding block, being in engagement with the rod holding unit, sets a desired radius of the joint.

12 Claims, 1 Drawing Sheet

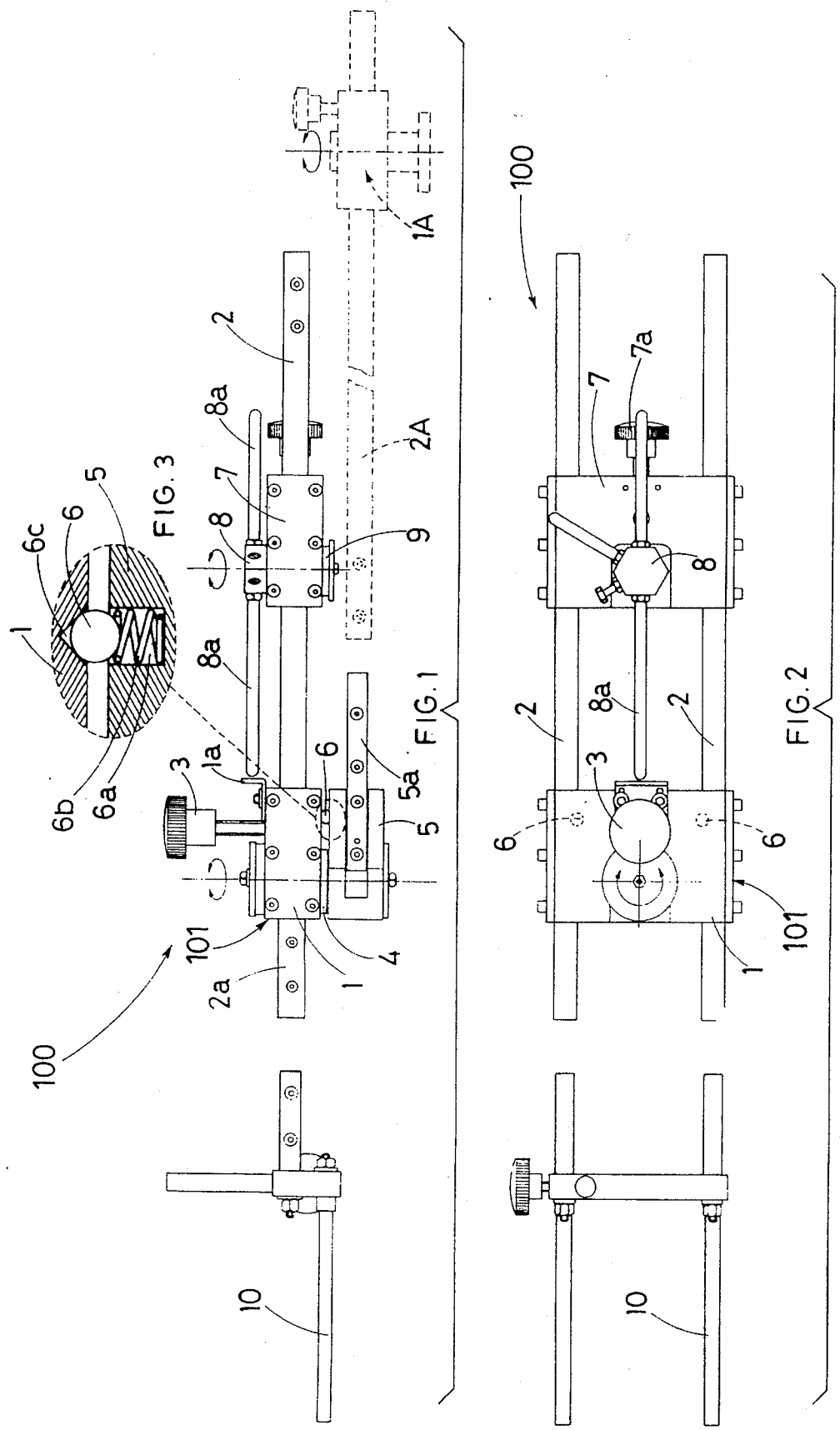

TOOL FOR CARPENTRY CALIPERS FOR CURVED FRAMES WITH JOINED END CORNERS

This utility patent application concerns a tool for carpentry calipers for making curved frames with joined end corners.

Currently inexpensive and easy to use carpentry calipers are available on the market which are generally used to curve the circumference of wing profiles of frames with curved lintel.

These calipers basically consist of a parallelepiped unit (revolving unit) revolving on a vertical pivoting pin having at the base a circular flange (a support) with a gauged perimeter, which is screwed to the working bench.

This unit acts as a support and guide for a pair of long parallel horizontal rods intersecting the same and sliding freely in both directions.

A support bracket is fitted at the two front ends of said rods for the electric cutter which is generally used to shape the wings of the frame.

A sliding block being fitted on the above pair of rods characterised by a stopping mechanism on which a "revolver" unit is fitted the same consisting of a revolving center tower from which a number of horizontal rods in different lengths project; this "revolver" unit being used when necessary to produce a preset series of concentric curved profiles having different radii of curvature.

Obviously the number of concentric profiles that can be produced is the same as the number of gauged rods of the "revolver" unit, while the difference between the radii of curvature of the different profiles of the series will quite naturally be exactly equal to the difference between the length of the gauged rods on the revolving tower.

In view of the fact that in the large majority of cases, the vault of the frames is always inferior to that of the semi-circumference curve, an unattractive edge will inevitably be formed at the intersection point between the lintel vault and the two side uprights.

The purpose of this invention is to create a structurally simple and inexpensive tool for installation on the above carpentry calipers as an accessory to produce connection curves between the curved profile of the transverse and the rectilinear sections of the uprights of the frame.

The tool (or an accessory unit) according to the invention is characterised by a similar structural configuration and operating principle as that of standard carpentry calipers, which are also used to curve profiles, be it with much smaller radii of curvature than those of the lintel vault.

The tool or an accessory unit according to the invention consists essentially of the above type of calipers characterised by a rod holding unit rotating and frictioning around a vertical pivoting pin, projecting from a support deck having a pair of parallel horizontal spigots at the back by which the same may be fitted to the front ends of the pair of rods (first rods) of standard calipers instead of fitting the same to the bracket of the electric cutter holder which fits on the front ends of the pair of rods (second rods) of the tool (the accessory unit) according to the invention.

The use of the accessory unit 100 according to the invention involves the simultaneous use of two magnetised squares, which are fixed to the work surface in a symmetrically opposing position in order to place two striker and hooking plates of the pair of caliper rods at the end of the oscillation run required by the electric cutter to produce the lintel vault, at whose ends the connection curves are realised with the uprights of the frame.

When the caliper can no longer continue its rotation around its pivoting pin, in that its rods oppose one of the above magnetised squares, the operator can nonetheless pull the electric cutter for a further run along a curved path with the centre of curvature on the pivoting pin, not of the standard calipers, but of the rod holding unit of the tool according to the invention; it is during this last run that the electric cutter produces the required connection curve. For major clarity the description of the invention continues with reference to the enclosed drawings which are intended for purposes of illustration and not in a limiting sense, whereby:

FIG. 1 is a side view of the tool according to the invention;

FIG. 2 is a top view of FIG. 1;

FIG. 3 shows a construction detail of the tool according to the invention.

With reference to the above figures, the tool 100 according to the invention consists of a rod holding unit 101 having a prismatic (supporting unit) unit (1) which acts as a support and guide for a pair of horizontal rods (second rods) (2) intersecting the same and sliding freely in both directions.

The free sliding action of the rods (2) in the supporting unit (1) may be prevented by means of a fixing ring nut (3) positioned above the supporting unit (1) which is free to rotate around a vertical pivoting pin (4) projecting from the deck (5), immediately under the supporting unit (1).

It should be noted that between unit (1) and deck (5) a friction element is provided which joins the same for the time that the torque moment applied to the supporting unit (1) is not great enough to overcome the resistance created by said friction element.

In the preferred embodiment of the invention illustrated in the above drawings, the friction element consists of a pair of spheres (6). Each sphere (6) is housed within one of two cavities (first cavity) (6a) on the upper face of deck (5) and is subjected to the expelling force of respective pre-compressed springs (6b).

Each of said spheres is partially expelled from its housing and wedged within a corresponding conical impression (cone-shaped cavity) (6c) on the bottom face of the supporting unit (1) which can therefore rotate with respect to the deck (5) only when the torque moment applied to the same is sufficient to expel the spheres (6) from their conical housings (6c), overcoming the expelling force of the underlying opposing springs (6b).

A sliding block (7) formed by a prismatic unit (a first unit) on which a "revolver" unit (a revolving unit) is mounted consisting of a tower (8) (a revolving tower) revolving around a pin (9) having a vertical axis, is fitted and slides on the pair of rods (the second rods) (2).

A number of radial rods (Sa) of different lengths being screwed to the revolving tower (8).

The sliding unit (7) may be stopped along the pair of rods (2) by means of a fixing ring nut (7a).

The back of the rod holding unit (1) having a vertical wing (1a) used as a stop striking and reference plate for the runs of the rods (2) within the supporting unit (1), when the "revolver" unit is used to produce a series of concentric curves with preset different radii of curvature.

It is obvious that the radius of curvature of the curve that the electric cutter follows increases when the rods (2) move forward with respect to the supporting unit (1) or vice versa.

A series of concentric curves may be produced quickly and accurately thanks to the "revolver" device which allows the rods (2) to perform a series of runs of different lengths but with preset value, one for each length of the gauged rods (the radial rods) (8a) screwed to the revolving tower (8).

The deck (5) being fitted at the back with a pair of parallel spigots (5a) having horizontal axis whose centre to centre distances and cross-sections allow the same to be fixed to the front end of the pair of rods (2) of standard calipers (1A), schematically shown in FIG. 1 by the broken line.

Number (10) in the enclosed drawings shows a standard bracket used to support the electric cutter, which is not shown in the drawing.

As mentioned, standard calipers (1A) are fitted with the tool (the accessory unit) 100 according to the invention, this bracket (10) must be fixed at the front ends of the rods (2a) of the tool in question (the accessory unit) 100 instead of at the front ends of the rods (2A) of the standard caliper (1A).

The above description and reference to the enclosed drawings make the operating principle of the tool according to the invention much clearer to understand.

In particular, said tool remain stationary while the rod-holder (1) unit does not rotate, overcoming the resistance of the frictioning element, around its pivoting pin (4) so that the same, during this passive phase, may be considered simply as a rigid extension of the rod (2A) of the standard caliper (1A) on which the same is mounted.

In other words, during the execution of the lintel vault, the electric cutter moves along a circumference curve whose centre is the pivoting point of the standard calipers (1A) on which the tool in question (the accessory unit) is mounted, while during the execution of the connection curves between the vault and the uprights, the electric cutter follows the circumference curve whose centre is the pivoting pin (4) of the rod-holder unit (1) of the tool (the accessory unit) according to the invention.

I claim:

1. A device for making a frame, the frame having at least two adjacent portions, each of a distinct curvature, wherein a joint between said at least two portions on the frame is rounded, the device comprising:

a carpentry caliper for outlining at least one of said at least two portions on the frame, an accessory unit movably secured to the carpentry caliper for outlining the joint between said at least two portions on the frame, and a cutting means secured to the accessory unit for cutting out said at least two portions and the joint therebetween;

the carpentry caliper comprising a circular flange to be secured to a workpiece, a pin extending vertically from the circular flange, a revolving unit pivotally secured to the pin spaced apart from the circular flange, and a pair of parallel first rods slidably secured to the revolving unit, each of said first rods having a front end, a distance between the revolving unit and the front ends of the first rods corresponding to a desired radius of the said at least one of said at least two portions of the frame;

the accessory unit comprising a rod holding unit secured to the front ends of the first rods on the carpentry caliper and extending a desired distance from the circular flange of the carpentry caliper, a pair of parallel second rods slidably secured to the rod holding unit, and a sliding block slidably secured to the pair of the second rods, the rod holding unit including means providing rotation of the second rods in respect to the first rods, wherein the sliding block, being in engagement with the rod holding unit, sets a desired radius of the joint, the second rods having front ends;

wherein the cutter means is secured to the front ends of the second rods.

2. The device of claim 1, wherein the rod holding unit includes a supporting unit and a deck spaced from the supporting unit and carrying a pair of parallel spigots each secured directly to the front end of the respective first rod, wherein the means providing rotation of the second rods in respect to the first rods includes a pivoting pin secured to the deck and to the supporting unit such that the supporting unit pivotly revolves with respect to the deck, and wherein a friction element is provided between the deck and the supporting unit, the friction element preventing an undesired rotation of the supporting unit with respect to the deck.

3. The device of claim 2, wherein at least one first cavity is provided on an upper surface of the deck, wherein at least one cone-shaped cavity is provided on a bottom surface of the supporting unit, wherein said friction element includes at least one sphere, said at least one sphere being secured within said at least one first cavity and said at least one cone-shaped cavity.

4. The device of claim 3, wherein a pre-compressed spring is secured within said at least one first cavity underneath the sphere, and wherein the sphere is partially expelled out of the first cavity by said pre-compressed spring.

5. The device of claim 1, wherein said sliding block includes a first unit directly secured to the second rods and a revolving unit mounted on the first unit, wherein the revolving unit includes a revolving tower and a plurality of radial rods of different lengths extending from the revolving tower.

6. The device of claim 5, wherein the rod holding unit includes a reference plate, and wherein a respective one of said plurality of the radial rods engages the reference plate to set the desired radius of the joint.

7. A method for making a frame having at least two adjacent portions, each of a distinct curvature, wherein a joint between said at least two portions on the frame is rounded, the method comprising the steps of:

providing a carpentry caliper for outlining at least one of said at least two portions on the frame, the carpentry caliper comprising a circular flange, a pin extending vertically from the circular flange, a revolving unit pivotally secured to the pin spaced from the circular flange, and a pair of parallel first rods slidably secured to the revolving unit, each of said first rods having a front end;

providing and movably securing an accessory unit to the carpentry caliper for outlining the joint between said at least two portions on the frame, the accessory unit comprising a rod holding unit secured to the front ends of the first rods on the carpentry caliper and extending a desired distance from the circular flange of the carpentry caliper, a pair of parallel second rods slidably secured to the rod holding unit, and a sliding block slidably secured to the pair of the second rods, the rod holding unit including means providing rotation of the second rods with respect to the first rods; and securing a cutting means to the accessory unit for cutting out said at least two portions and the joint therebetween, the cutter means being secured to the front ends of the second rods;

securing the circular flange of the carpentry caliper to a workpiece and extending the first rods, thereby providing a distance between the revolving unit and the front ends of the first rods corresponding to a desired radius of the said at least one of said at least two portions of the frame, and cutting out said at least one of said at least two portions of the frame;

extending and fixing the rod holding unit secured to the front ends of the first rods on the carpentry caliper at a desired distance from the circular flange of the carpentry caliper, and engaging the sliding block to the rod holding unit, thereby setting a desired radius of the joint to be cut off, and cutting out said joint.

8. The method of claim 7, wherein the rod holding unit includes a supporting unit and a deck spaced from the supporting unit and carrying a pair of parallel spigots secured directly to the front ends of the first rods, wherein the means providing rotation of the second rods in respect to the first rods includes a pivoting pin secured to the deck and to the supporting unit such that the supporting unit pivotly revolves with respect to the deck, the method further comprising the step of providing a friction element between the deck and the supporting unit, the friction element preventing an undesired rotation of the supporting unit in respect to the deck.

9. The method of claim 8, further including the steps of providing at least one first cavity on an upper surface of the deck, providing at least one cone-shaped cavity on a bottom surface of the supporting unit, providing the friction element with a pair of spheres, and securing each sphere of said pair of spheres within said at least one first cavity and said at least one cone-shaped cavity.

10. The method of claim 9, further including the step of securing a pre-compressed spring within said at least one first cavity underneath said each sphere, such that said each sphere is partially expelled out of the first cavity by said pre-compressed spring.

11. The method of claim 7, further including the steps of providing said sliding block with a first unit directly secured to the second rods and mounting a revolving unit on the first unit, wherein the revolving unit includes a revolving tower and a plurality of radial rods of different lengths extending from the revolving tower.

12. The method of claim 11, further including the rod holding unit with a reference plate, and engaging a respective one of said plurality of the radial rods to the reference plate to set the desired radius of the joint.

* * * * *